FIG. 1

INVENTOR.
NICHOLAS DeWOLF

Feb. 9, 1971  N. DE WOLF  3,562,644
CIRCUIT TESTER PROVIDING CIRCUIT-SELECTED TEST PARAMETERS
Filed June 14, 1968  8 Sheets-Sheet 7

FIG. 9

INVENTOR.
NICHOLAS DeWOLF
BY

ATTORNEYS

FIG. 10

United States Patent Office 3,562,644
Patented Feb. 9, 1971

3,562,644
CIRCUIT TESTER PROVIDING CIRCUIT-SELECTED TEST PARAMETERS
Nicholas De Wolf, c/o Teradyne, Inc., 87 Summer St., Boston, Mass. 02110
Filed June 14, 1968, Ser. No. 737,141
Int. Cl. G01r 15/12
U.S. Cl. 324—73       18 Claims

ABSTRACT OF THE DISCLOSURE

This application discloses a circuit tester particularly useful for digital integrated circuits and comprising a chassis, one or more family limit cards, and one or more device test cards. The family limit cards are each adapted to be detachably connected to the chassis, and each includes components selected to adapt the apparatus to test one of a family of circuits. The device test cards are each adapted to be connected to the chassis and to a particular circuit to be tested, and each includes components selected to adapt the apparatus to test the particular circuit. Means are provided for subjecting a circuit under test to a set of analog tests for each of a full set of digital input signals, and indicating improper responses to those tests. The full specification should be consulted for an understanding of the invention.

---

My invention relates to the art of measuring and testing, and particularly to a novel system for rapidly testing the quality and performance of electrical circuits.

The advent of the integrated circuit has considerably complicated the problems faced by manufacturers and users of electronic circuits in the course of testing the circuits for purposes of quality control, inspection and maintenance. The problem is particularly acute with digital circuits in which the actual effective circuit at any time is a function of the sequence of signals applied to the input terminals. A very large number of tests would be necessary to determine whether such a circuit was operable within specifications under all conditions that might be encountered. For example, one of the simpler circuits in common use is a plastic-packaged fourteen-pin integrated circuit comprising four independent two-input, one-output NAND gates, each fed by a common power supply input terminal and sharing a common ground connection. A complete program, to determine whether or not such a circuit included improper short circuits, open circuits, or one-way short circuits caused by parasitic diode connections, might require up to $2^{14}$ tests. In addition to these tests, a complete testing program would include checking the output terminals to see that they produced the proper digital signals in response to all possible input signals. Further tests would be necessary to determine whether the lowest voltage accepted by one of the gates as a 1 command was above a specified minimum, and that the highest voltage accepted as a 0 command was below a specified maximum. Finally, it would be necessary to determine whether the supply current drawn under all possible conditions was not above a specified maximum, and that the voltage level was always adequate. The problem is compounded by the fact that there are many different types of integrated circuits available, including many different gate circuits and other integrated circuits such as flip-flops, expanders, buffers, counters, switch registers, adders, half-adders, and the like, and combinations of such circuits integrated together.

It has been found quite impractical to make a truly exhaustive set of tests on integrated circuits. On the other hand, the cost of finding and replacing a defective integrated circuit after it has been soldered into a complex system is so high that there is a strong incentive to do as much testing as possible.

Prior to my invention, one of two approaches has been taken to the testing problem. The integrated circuit manufacturers, and large volume users, have employed highly complex and expensive testing systems that make a selected set of tests on an integrated circuit under the control of a specially programmed digital computer. These generally comprise, in addition to the computer, a number of separate voltage and current sources, one or more measuring units, and a switching matrix which assigns in sequence source and measurements to various pins on the integrated circuit under the control of the computer program. Such a system obviously increases the rate at which tests can be made, but still has undesirable limitations. Typically, from two to ten milliseconds is required for each test made simply because of the time required for switching the matrix. In addition, because several test commands have to be considered in programming each test, it is quite impractical to consider testing for all functional combinations of ones and zeros on even the simplest multiple gate circuit. Instead, a carefully planned sequence of tests, typically including from 50 to 100 tests, is performed. Even this elaborate testing system, however, will pass an occasional device that will cause system malfunction when installed by reason of a defect that was not discovered because no test for it was performed. As a simplified example, a two terminal AND gate might pass a sequence of tests that included the application of three out of the four possible input signal combinations even though both input terminals were open. More complex circuits may fail in innumerable ways that would not be discovered in a limited test program. Accordingly, the computer operated testing systems are not completely satisfactory even for those who can afford the costs of purchasing, programming and operating them.

Low volume users of integrated circuits; i.e., those using less than about a quarter of a million units per year, cannot justify the cost of the complex computer operated systems. For their use, simplified systems have been developed which approximate the more complex systems by using hand wired programming boards, wired logic and storage systems in place of the computer and its program, manual or semi-automatic program sequencing and switching, and other such techniques. However, such apparatus is inherently less reliable and efficient than the more complex systems available, and requires tedious and time-consuming hand wiring to set up each particular set of test conditions. It is the object of my invention to greatly simplify the testing of integrated circuits, while reducing time and cost of testing at a given level of reliability.

Briefly, the apparatus of my invention comprises three structurally separate sub-assemblies which when plugged together comprise test apparatus for a particular integrated circuit. The first of these sub-assemblies comprises permanent test equipment that can be used with any integrated circuit having not more than the number of input, output and power supply terminals for which the apparatus has been designed.

The second sub-assembly, conveniently a printed circuit board, is pre-wired to adapt the apparatus to perform a particular class of tests on a given family of integrated circuits. That arrangement takes advantage of the fact that manufacturers commonly make different circuits in families designed to be used together to make systems. The different circuits in such a family share a common set of logical input voltage or current levels, and have compatible power supply requirements.

The third sub-assembly comprises a printed circuit card or the like which is pre-wired to adapt the apparatus to a particular device of an integrated circuit family. This sub-assembly preferably includes a socket or other connector to receive the particular integrated circuit to be tested.

When assembled, the apparatus comprises a control unit which produces sequencing signals to cause the apparatus to sequentially perform a set of tests on a device connected to the device test card. These sequencing signals are applied to an input function generator that sequentially produces a complete set of the input signals to which the device under test may be subjected in actual use.

The output signals of the input function generator are used to step an output function generator, which may be a device like the device under test, or any other device having the same logical truth table. There are thus produced a set of signals corresponding to the inputs that the device under test will be supplied in practice, and a set of signals corresponding to the output signals that should be produced by the device under test.

The input and output function generators are used to control a test power supply so that at each stage of the test the device under test is supplied with an appropriate set of analog input signals. There is also produced for each terminal a proper output signal with which the actual output signal produced by the device can be compared.

Detection apparatus is provided for detecting an inappropriate response of the device to an applied input signal, or the production of an output signal that is either logically incorrect or outside of specifications. When such a condition is detected, it is displayed, and the operator or an automatic circuit handler can make appropriate disposition of the device under test.

The apparatus is arranged to be operated in a manual mode, in which the control unit will stop sequencing the testing circuits when a rejected device is detected. The defective condition will then be displayed until the operator presses an advance button to continue the sequencing. In this manner, an extensive analysis can be made of the defects that may exist in a particular device.

The apparatus is also preferably arranged to operate in an automatic mode, in which the rejects are briefly displayed, whereupon the apparatus continues to sequence through the full series of tests. By that arrangement, a reasonably complete analog test of the properties of the device under test can be made under all expected input and output conditions in a very short time. By using the digital signals to control the selection of the analog test signals, both digital and analog testing can be done with a minimum of time and programming.

The construction of the apparatus of my invention, and its mode of operation, will best be understood in the light of the following detailed description, together with the accompanying drawings, of a preferred embodiment thereof.

Figure 1:
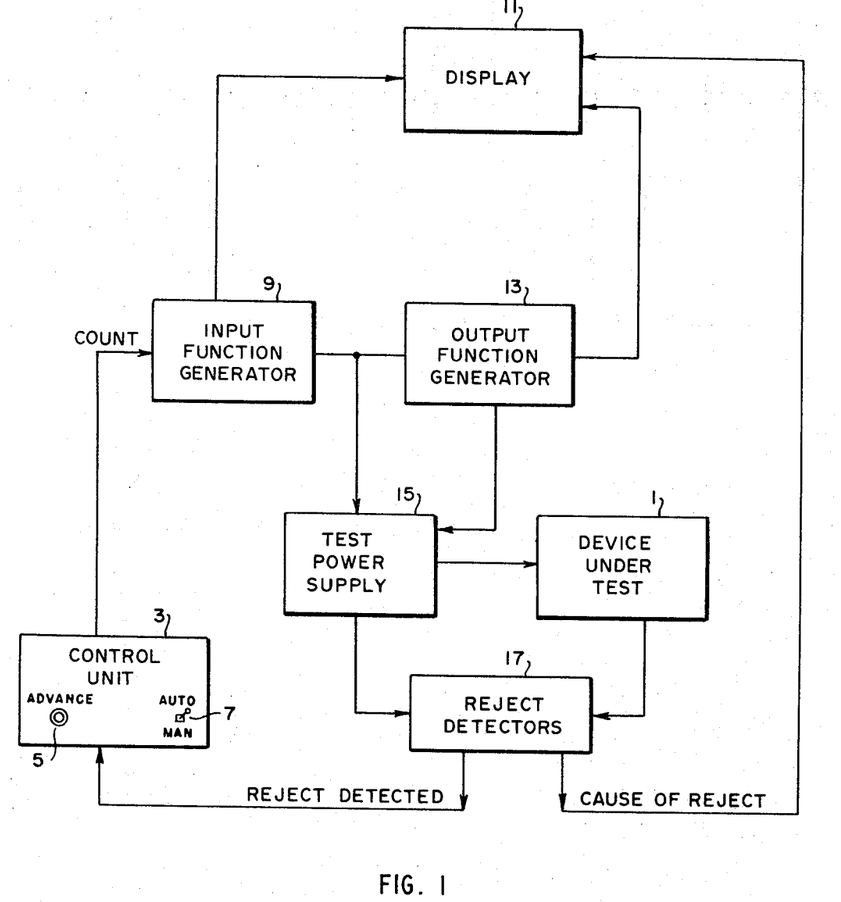
FIG. 1 is a functional block diagram of the apparatus of my invention showing its relation to a device under test in operation.

FIG. 1 shows the apparatus of my invention connected to perform a sequence of test operations on a device under test shown schematically at 1. The apparatus comprises a control unit 3. The control unit 3 is provided with an advance pushbutton 5 and a selector switch 7 to set the control unit for operation in either automatic or manual modes. In addition, a conventional on-off switch, not shown, would be provided.

In operation in either the automatic or manual mode, the control unit 3 produces count pulses and applies them to an input function generator 9 until a defect in the device 1 is detected. The input function generator sequentially produces a set of output signal sequences for each input signal sequence to which the device under test will be exposed in operation.

The output signals of the input function generator 9 are applied to a display unit 11, thereby indicating the combination of inputs currently being produced, to an output function generator 13, and to a test power supply 15.

The output function generator 13 responds to signals from the input generator 9 by producing a sequence of output signals corresponding to the output signals that the device 1 would produce when operating properly in response to the same input signals. The output signals from the function generator 13 are applied to the display unit 11, to indicate to the operator what the expected output at any given time may be, and to the test power supply 15.

The test power supply 15 produces power supply levels appropriate for the device under test, and also acts in response to the signals produced by the input function generator to apply corresponding input signals to the device 1 that are at appropriate analog levels for the test being performed. The device 1 responds to those input signals to produce output signals and apply them to a set of reject detectors 17. The reject detectors 17 also sense the current drawn by the device under test in response to the signals supplied by the power supply 15.

When a defective circuit is detected, the reject detectors 17 supply a signal indicating the cause of the reject to the display 11, and simultaneously produce a signal indicating that a reject has been detected and apply it to the control unit 3. If the control unit 3 is operating in the manual mode, the production of count pulses will stop and the display will be held until the advance push-button 5 is depressed to cause the sequence to continue. In the automatic mode of operation, counting pulses will be interrupted for a period sufficient to present a readable display of the cause of the reject, and then the sequence of tests will automatically be continued until the next reject is detected.

Figure 2:
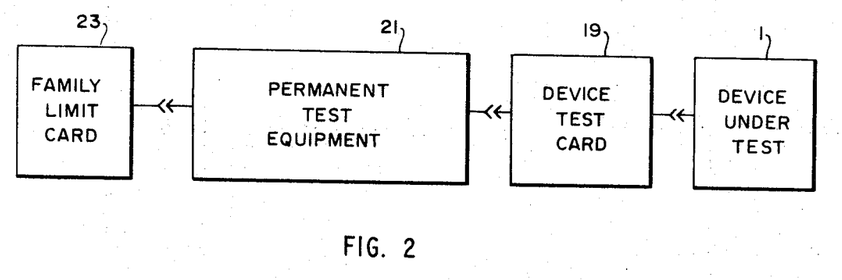
FIG. 2 is a structural block diagram of the apparatus of my invention, showing the relation of the component parts to each other and to the device under test.

FIG. 2 illustrates the structural relationships between the parts of the apparatus of FIG. 1. The device 1 that is under test is directly connected to a device test card 19, on which are located electrical components tailoring the apparatus to the particular device being tested. The device test card 19 is connected to permanently wired test equipment 21. The permanently wired test equipment 21 is connected to a family limit card 23, on which are wired components to tailor the apparatus to the particular family of integrated circuits to be tested and to determine the class of test to be performed. For example, it may be desired to test a particular family of devices for use in one system or environment to one set of specifications, and to test the members of the same family under more or less rigorous specifications for a different system or environment. These changes can be made merely by changing the family limit card 23.

Figure 3:
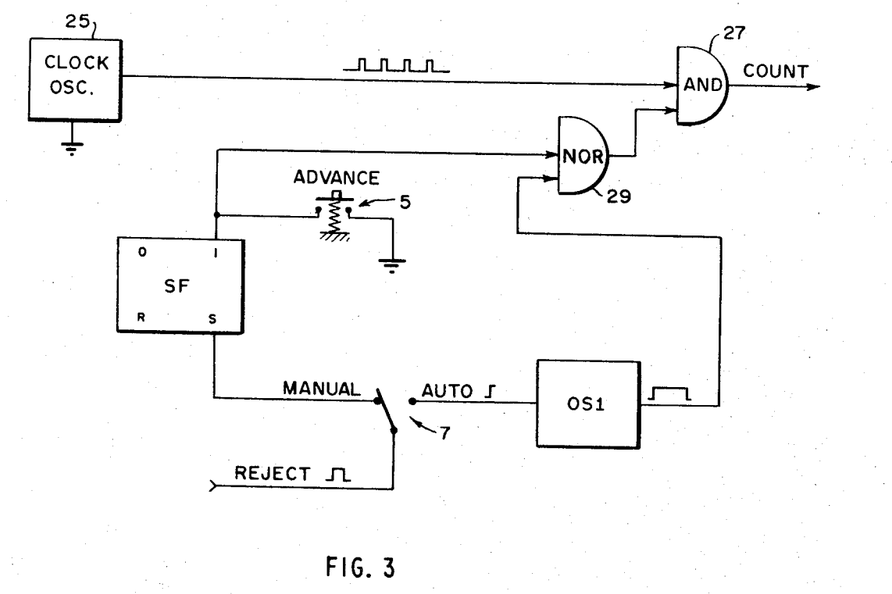
FIG. 3 is a schematic wiring diagram of a control unit forming part of the apparatus of FIG. 1.

FIG. 3 shows schematically the apparatus comprising a control unit suitable for use as the control unit 3 in FIG. 1. The apparatus comprises a conventional clock oscillator 25 of any suitable known construction, preferably provided with shaping circuits to produce a series of clock pulses suitable for advancing a counter. The output signal from the oscillator 25 is applied to one terminal of a two-input AND gate 27 of any conventional construction.

While the particular set of logic levels and truth values employed is a matter of choice, for clarity and simplicity of illustration it will be assumed that a logic 1 is a positive level above ground potential, and a logic 0 is ground potential. Thus, the AND gate 27 will produce a positive pulse each time a positive-going clock pulse is applied to one input terminal and a positive pulse or level is simultaneously applied to the other input terminal with respect to ground.

The second input terminal of the AND gate 27 is connected to the output terminal of a conventional NOR gate 29. The gate 29 is provided with two input terminals, and will produce a positive output signal when and only when both input terminals are at ground potential. If either input terminal of the NOR gate 29 is at a positive potential with respect to ground, its output terminal will be at ground potential.

One input terminal of the NOR gate 29 is connected to the logic 1 output terminal of a flip-flop SF. This flip-flop may be of any conventional construction, but as here shown is of the type which produces a positive output terminal at its logic 1 output terminal when set by a positive signal applied to its set input terminal S, and a ground level at its logic 1 output terminal when a positive signal is applied to its reset input terminal R or when the logic 1 output terminal is grounded. As shown, the advance pushbutton 5 is connected to apply ground to the logic 1 output terminal, and thus reset the flip-flop SF, when the pushbutton is momentarily depressed.

The flip-flop SF can be set when the control switch 7 is set to its manual position and a positive REJECT pulse is applied. The flip-flop SF will then be set to disable the NOR gate 29 and thereby the AND gate 27 until the advance pushbutton 5 is depressed.

In the automatic position of the switch 7, a REJECT pulse that may occur is supplied to trigger a conventional one-shot multivibrator OS1. The multivibrator OS1 may be of the type which has its output terminal normally at ground potential, and which produces a pulse on that terminal above ground for a predetermined interval when a positive-going trigger pulse is applied to its input terminal. This output pulse may, for example, be of about 10 milliseconds in duration, and for that period the AND gate 27 will be disabled. By that arrangement, the count pulses will be interrupted for a time sufficient to permit a visible display to be produced, in a manner that will appear.

Figure 4:
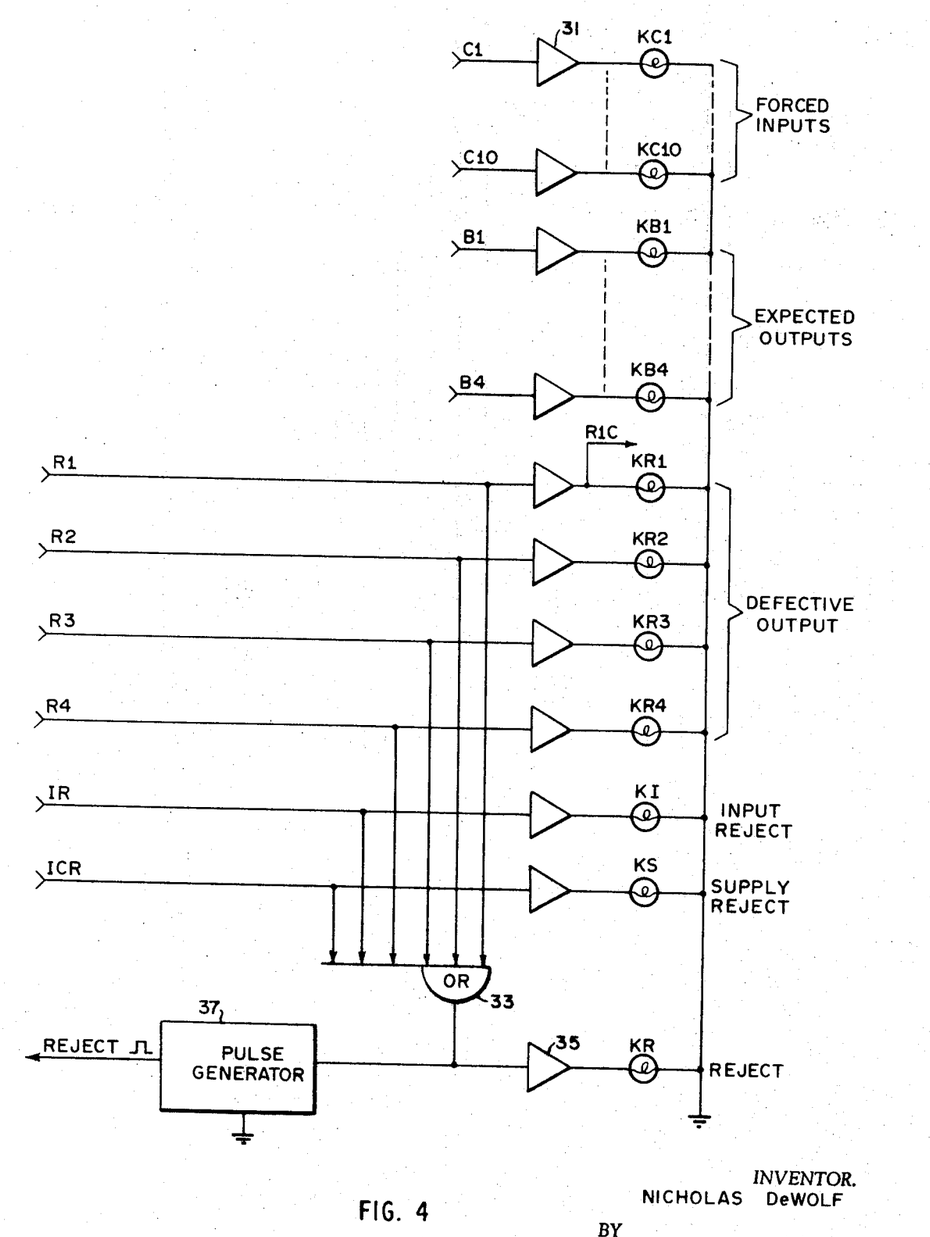
FIG. 4 is a schematic wiring diagram of a display unit forming a part of the apparatus of FIG. 1.

FIG. 4 shows apparatus suitable for use as the display unit 11 in FIG. 11. As shown in FIG. 4, the unit comprises a first set of ten indicating lamps KC1 through KC10 supplied with illuminating current by means of conventional driver amplifiers, such as the amplifier 31 shown for the lamp KC1, in response to a set of digital signals C1 through C10 that repeat the state of the input function generator 9 of FIG. 1.

A second set of indicating lamps, comprising four lamps KB1 through KB4, is provided to repeat the output of the output function generator 13, and thus indicate the expected output from the device under test in response to the forced inputs indicated by the lamps KC1 through KC10. The lamps KB1 through KB4 are illuminated when the corresponding input terminals B1 through B4 are above ground.

In one embodiment of my invention, the forced input and expected output lamps were arranged to be lit when the corresponding input signal was low, or logic 0. For clarity and consistency, as the matter is one of choice or design, they will be here shown and described as being lit when the corresponding input terminal is at logic 1, or above ground.

As will appear, in the normal sequencing of the apparatus when no defect is detected, the signals C1 through C10 and B1 through B4 are each individually present half the time, so that the lamps KC1 through KC10 and KB1 through KB4 glow dimly at half operating current. When a display is to be held, the selected lamps will be illuminated with full operating current, causing them to glow brightly.

If one of four output terminals of the device under test produces a defective output signal, one of four indicating lamps KR1 through KR4 will be illuminated. These lamps are controlled by reject signals R1 through R4, each produced in a manner to be described when a corresponding output terminal of the device produces a defective output. As indicated for the lamp KR1, these output reject circuits may also be used to provide control signals, such as the signal R1C, for use in automatic integrated circuit handling equipment, for example, to produce an appropriate control action to select the bin into which the integrated circuit is to be sorted. However, as the details of suitable card handling apparatus form no part of my invention and are known to those skilled in the art, that use of the apparatus of my invention will be mentioned only in passing.

While it is within the scope of my invention in its broader aspects to identify particular defective input terminals, in the embodiment here described only one input indicating lamp KI is provided which is lit when any input terminal presents an improper impedance to the test power supply. This lamp KI is lit when a signal IR is produced in a manner to be described below.

A supply indicating lamp KS is provided which is illuminated when the device under test draws more than the prescribed amount of current in operation. This lamp is lit when a reject signal ICR is produced in a manner to be described below.

The reject signals R1 through R4, IR and ICR are applied to the six input terminals of an OR gate 33. When any input signals applied to the gate 33 is above ground, the gate will produce an output signal that is above ground to cause a driver amplifier 35 to illuminate a lamp KR that indicates any reject detected. The output of the gate 33 also operates a conventional pulse generator 37 to produce the REJECT pulse discussed in connection with the control apparatus of FIG. 3.

Figure 5:
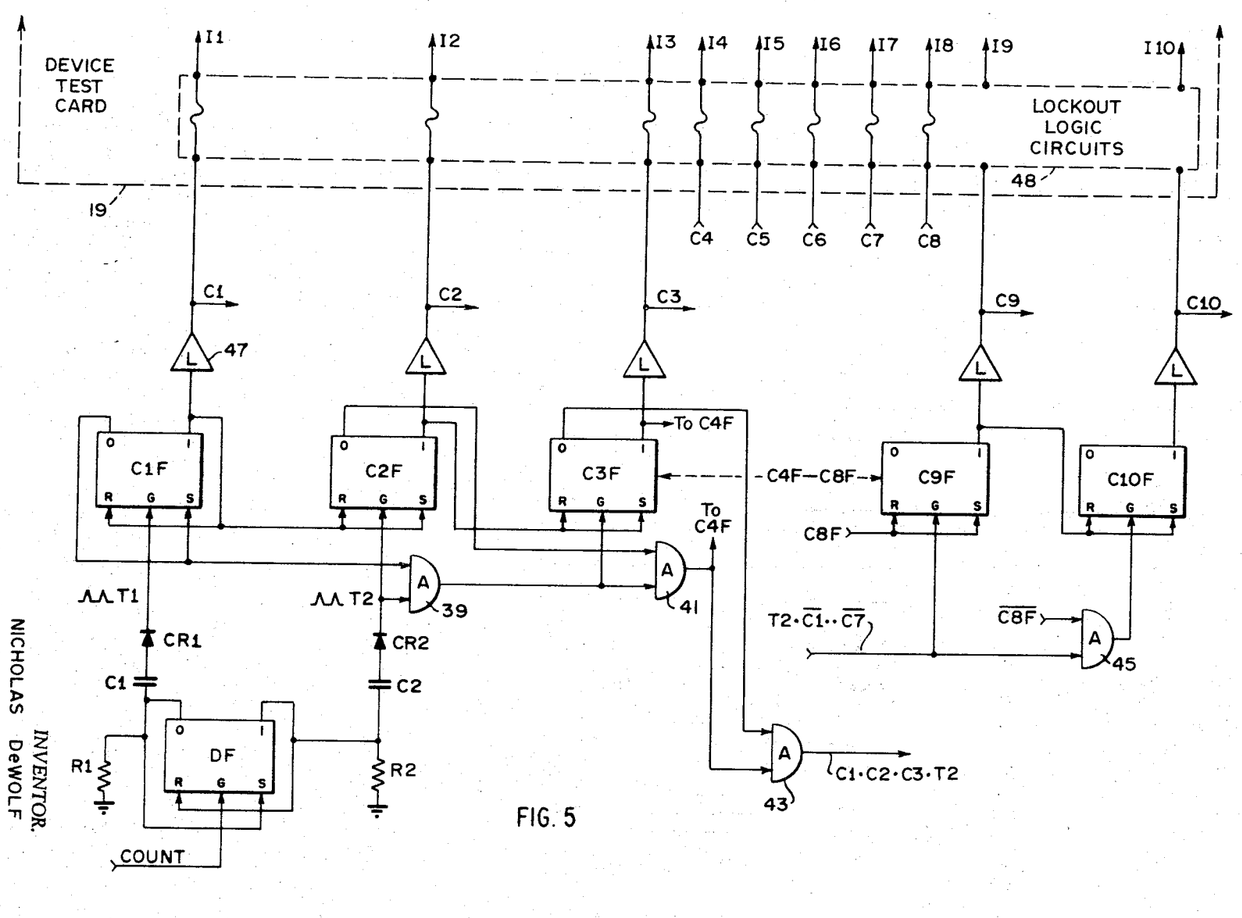
FIG. 5 is a schematic diagram of an input function generator forming a part of the apparatus of FIG. 1.

FIG. 5 shows a preferred embodiment of the input function generator 9 in accordance with my invention. The input function generator may simply comprise a fast binary counter. However, in accordance with the preferred embodiment shown in FIG. 5, the input function generator includes a counter arranged to count in a particular sequence over the full range of possible output sequences. The preferred sequence is one of the class in which each output sequence of the counter is produced by changing only one bit of the previous sequence. The use of a sequence generator of this type makes possible the testing of devices which might respond ambiguously if two input signals were changed at the same time. For example, a simple flip-flop of the type made by cross-connecting two NAND gates will be set unambiguously so that both of the NAND gates produce a 0 output signal if two logic 1 input signals are simultaneously applied to its set and reset terminals. However, the state in which such a flip-flop will be if both logic 1 signals are removed from the terminals at about the same time will depend on which is effectively removed first, a matter that is essentially unpredictable unless only one input signal is changed at a time. In general, such a sequence could be generated by a binary counter followed by a complex decoding matrix of gates. However, I have discovered that such a sequence can be produced very simply by the apparatus of FIG. 5.

The illustrative embodiment of my invention described made provision for the testing of circuits having up to ten active input terminals and four active output terminals, in addition to a ground and a power supply terminal. For the purpose of producing input signal sequences comprising all possible states of the ten input terminals, ten counting flip-flops C1F through C10F were provided.

As shown, the counter flip-flops are controlled by a flip-flop DF of the conventional synchronous variety connected as a complementing flip-flop. For that purpose, the logic 1 output terminal is connected to the reset level input terminal R, the logic 0 output terminal is connected to the set level input terminal S, and the count pulses produced by the apparatus of FIG. 3 are applied to the gate input terminal G of the flip-flop. This flip-flop DF, as well as other synchronous flip-flops to be described, may be of the well known variety in which both a pulse and a level are required to change the state of the flip-flop. A pulse applied to the gate terminal G serves to gate the flip-flop either for setting or resetting. With the connections shown, with the flip-flop DF set, its logic 1 terminal will be positive, and its logic 0 terminal will be at ground. Thus, the flip-flop is in condition to be reset by the next gating pulse. When the flip-flop is reset, it is then conditioned to be set on the next following gate pulse. The flip-flop DF will thereby be alternately set and reset by succeeding count pulses.

The logic 1 and logic 0 terminals of the flip-flop DF are each connected to a pulse forming network. Thus, the logic 0 output terminal of the flip-flop is connected to ground through a resistor R1, and to the gating input terminal G of the flip-flop C1F through a capacitor C1 in series with a diode CR1. By this arrangement, each time the flip-flop DF is reset so that its logic 0 output terminal goes from ground toward a positive level, a positive-going pulse T1 will be applied to the gating terminal G of the flip-flop C1F.

Figure 6:
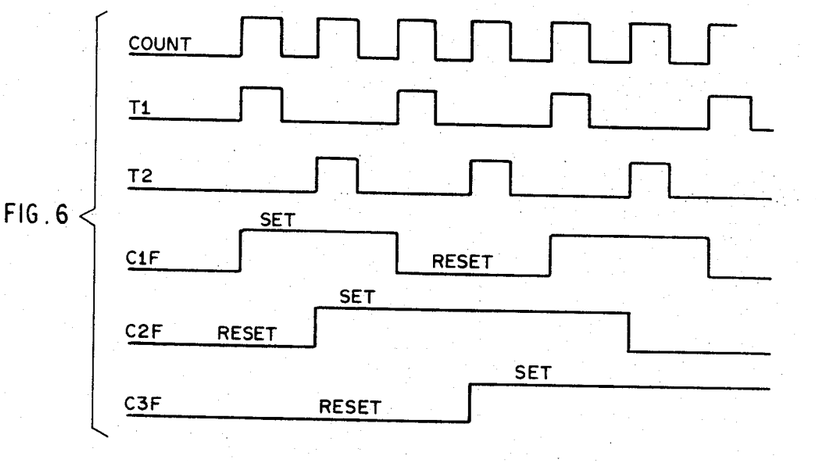
FIG. 6 is a timing diagram illustrating the operation of the apparatus of FIG. 5.

Similarly, the logic 1 output terminals of the flip-flop DF is connected to ground through a resistor R2, and to the gate input terminal G of a flip-flop C2F through a capacitor C2 in series with a diode CR2. By that arrangement, each time the logic 1 output terminal of the flip-flop DF goes positive as the flip-flop is set, a positive-going gate pulse T2 is applied to the gate terminal G of the flip-flop C2F. Referring to FIG. 6, the count pulses are thus used to produce two trains of pulses T1 and T2 that are 180 degrees out of phase.

As noted above, the flip-flop C1F is connected as a complementing flip-flop in the same manner as the flip-flop DF, so that at each T1 pulse its state will be changed. Each of the flip-flops C2F through C10F has its set and reset level input terminals connected to the logic 1 output terminal of the next preceding flip-flop in the series. However, each of these flip-flops C2F through C10F receives a different gating input signal.

As noted above, the gate input terminals of the flip-flop C2F receives each pulse T2. These pulses T2 are also applied to one input terminal of a two-input AND gate 39. A second input terminal of the same gate 39 is connected to the logic 0 output terminal of the flip-flop C1F. The gate 39 will thus produce an output pulse when a T2 pulse is applied only when the flip-flop C1F is in its logic 0 state. The output terminal of the gate 39 is connected to the gate input terminal of the flip-flop C3F. The flip-flop C3F will thus be complemented when and only when a T2 pulse is produced with the flip-flop C1F in its logic 0 state and the flip-flop C2F in its logic 1 state.

The output signal from the gate 39 is applied to one input terminal of a two-input AND gate 41. The second input terminal of the gate 41 is connected to the logic 0 output terminal of the flip-flop C2F. The gate 41 thus produces an output pulse only at T2 time with the flip-flops CS1F and C2F both reset.

The flip-flops C4F through C8F and their connections are not shown in detail, as they are the same as the connections for the flip-flops C3F and C9F. As indicated, the logic 1 output terminal of the flip-flop C3F is connected to the flip-flop C4F, in the same manner that the logic 1 output terminal of the flip-flop C8F, not shown, is connected to the flip-flop C9F. The output of the gate 41 is connected to the gate input terminal of the flip-flop C4F, and to one input terminal of a two-input AND gate 43. The second input terminal of the AND gate 43 is connected to the 0 output terminal of the flip-flop C3F. The flip-flops continue to be interconnected in this manner, and as indicated for the flip-flop C9F, its gate input terminal signal is produced at T2 time when all of the preceding flip-flops C1 through C7 are reset. The flip-flop C9F will be complemented when that pulse is produced and when the flip-flop C8F is in its logic 1 state. The flip-flop C10F receives a gating pulse from an AND gate 45, that responds to flip-flop C8F in its reset state and to the previous gating pulse for the flip-flop C9F.

Referring to FIG. 6, it will be apparent that with the connections shown in FIG. 5, the flip-flop C1F will be complemented on each T1 pulse. The flip-flop C2F will be complemented on every other T2 pulse, with the flip-flop C1F in its logic 1 state. The flip-flop C3F will be complemented on every fourth T2 pulse, when the preceding flip-flop C2F is set and the flip-flop C1F is reset. Similarly, each of the higher ordered flip-flops will be complemented on a T2 pulse when the next preceding flip-flop is set and all other preceding flip-flops are in their reset state. It will be apparent to those skilled in the art that at each pulse T1 or T2, only one flop-flop is complemented so that the desired sequence of states is produced.

Output signals from the flip-flop C1F through C10F can be taken from either output terminal of the corresponding flip-flops, but as here shown are taken from the logic 1 output terminals of each flip-flop. These logic 1 output terminals are connected to the input terminals of conventional limiter amplifiers such as the amplifier 47, whereby standard driving signals C1 through C10 of suitable level are produced. The signals C1 through C10 are applied to the indicator lamps KC1 through KC10 as described in connection with FIG. 4.

It is noted that no provision is made for resetting the flip-flops C1F through C10F to a standard state. Such a resetting operation is not necessary, as the full testing sequence will be produced regardless of the initial state of the flip-flops and whether the apparatus is started on a T2 pulse or a T1 pulse, although it will enter the sequence at a different point in dependence on which pulse is produced first. For example, suppose that operation is started for the T1 pulse when the apparatus happens to be in the state, reading from left to right in FIG. 5, 0110101100. Since the flip-flop C1F is complemented on each T1 pulse, the next sequence assumed by the flip-flops would be 1110101100. At the next T2 pulse, only the flip-flop C2F could be complemented, and the operation would continue properly. On the other hand, assuming the same starting sequence and that operation begins on a T2 pulse, the apparatus would next assume the state 0100101100 and proceed from there. It will be apparent that the counter could be made fast enough so that the device under test cannot be connected to the tester and then removed from the tester before at least one complete sequence of operation has been performed, so that it makes no difference at which point the test sequence is started.

If it is desired to provide the device under test with all possible input signal sequences, the signals C1 through C10 could be used for the purpose. In practice, there may be input signal conditions to which a particular device would not be expected to respond properly, or which are not needed in testing it.

To exclude such undesired inputs the input function generator would in general include lock-out logic circuits schematically indicated at 48 in FIG. 5. For some purposes, it might be desirable to make a set of gates to lock out particular sequences; for example, to ensure that two input terminals of the device under test were not subjected to the same input signal at the same time. Many variations of such circuits might be required and could be designed by conventional procedure. As here shown, I have simply illustrated apparatus for use in testing a device having less than the maximum number of input terminals. The lock out circuits for this purpose merely comprise jumpers to connect the input signals leads C1 through C8 to corresponding input signal supply terminals I1 through I8, and open circuits presented to the lines C9 and C10 that would be connected to the corresponding input signal supply terminals I9 and I10 if such were needed.

Since the lock out logic appropriate for a given device will in general be peculiar to the device itself, as indicated in FIG. 5 the lock-out logic circuits 48 would be mounted on the device test card 19. The rest of the apparatus shown in FIG. 5 would form a part of the permanent test equipment shown at 21 in FIG. 2.

Figure 7:
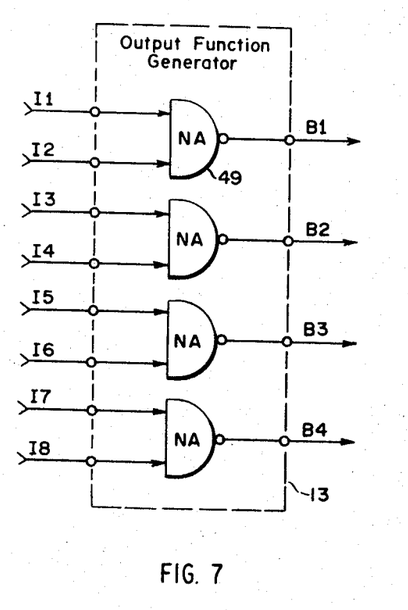
FIG. 7 is a schematic wiring diagram of an output function generator in accordance with a particular embodiment of my invention.

FIG. 7 shows a typical output function generator 13. This apparatus would also be mounted on the device test card, and might in its simplest form simply comprise a device like the device under test. However, in general it is merely necessary that the output function generator have the same truth table as the device under test.

To illustrate the construction and operation of my invention, I have chosen an integrated circuit comprising four independent NAND gates as a typical device under test. For that purpose, the output function generator 13 might similarly comprise four independent two-input terminal NAND gates, shown schematically by the symbol NA. The several input terminals of these gates are shown connected to receive the input signals I1 through I8 produced by the input function generator in FIG. 5.

Each of the NAND gates such as 49 produces an output logic 1 signal when a logic 0 signal is applied to either or both of its input terminals, and produces a logic 0 output signal when both input terminals are at logic 1. The output signals of these gates produce the signals B1 through B4 that control the indicating lamps KB1 through KB4 in FIG. 4, and perform other functions to be described.

Figure 8:
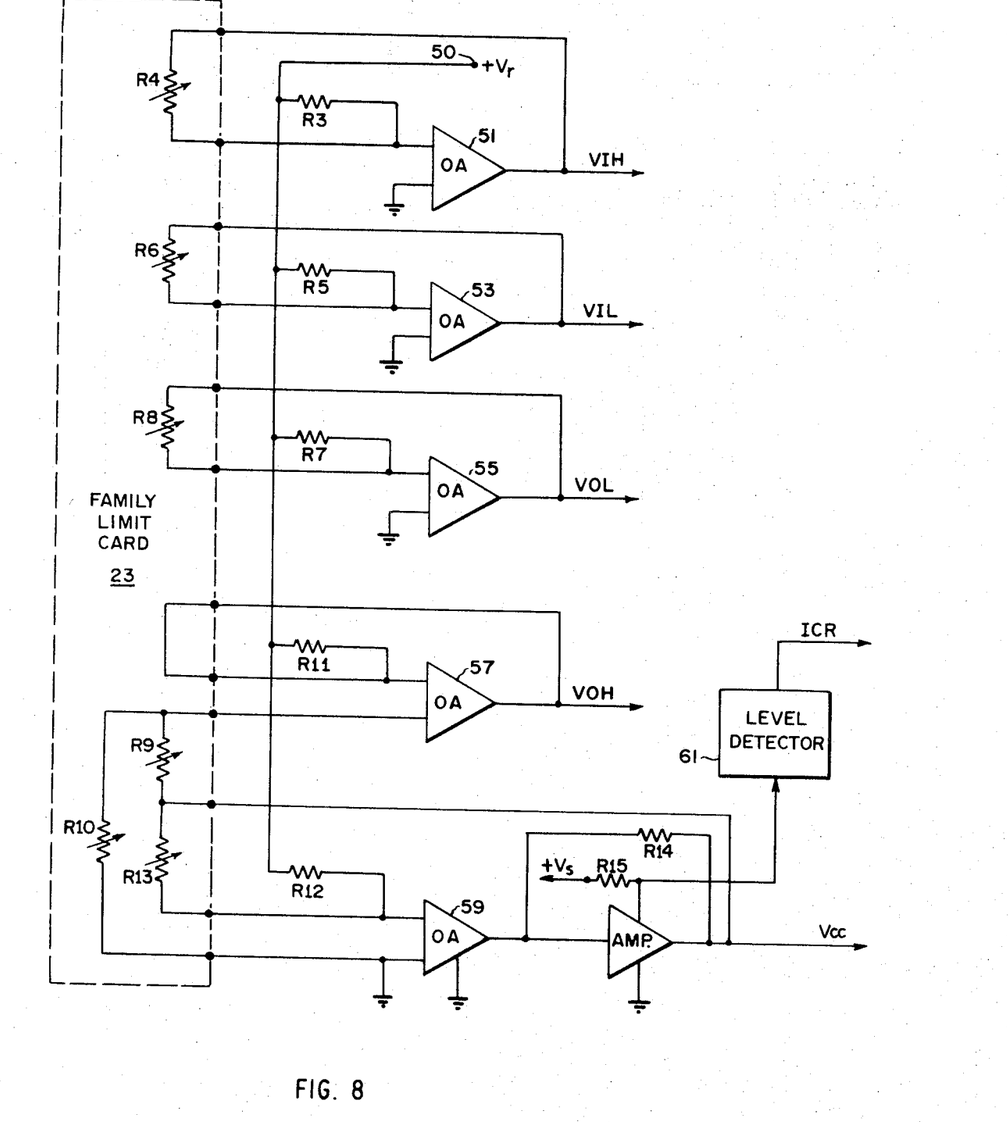
FIG. 8 is a schematic wiring diagram of a portion of the test power supply of FIG. 1 including one of the reject detectors forming a part of the apparatus of FIG. 1.

FIG. 8 shows a portion of the test power supply used in the apparatus of my invention. All of the apparatus of FIG. 8 not shown on the family limit card forms part of the permanent test equipment 21 in FIG. 2.

While any combination of test voltages, pulses, levels, currents and the like that might be required by a particular device could manifestly be provided, as here shown I have provided apparatus for producing five test input voltages desired from a single stabilized reference voltage $V_r$, of for example, +5 volts, appearing between a supply terminal 50 and ground. The test voltages are produced by a set of operational amplifiers 51, 53, 55, 57 and 59.

The amplifier 51 produces an output voltage VIH to serve as a standard for testing the impedance of an input terminal when the input signal is to be logic 1. For this purpose, the amplifier 51 has one input terminal grounded, and a second input terminal connected to the supply terminal 50 through a resistor R3. Feedback is provided by an adjustable resistor R4 that is mounted on the family limit card 23. The adjustment of this resistor makes it possible to change the tolerance to which the input impedance is to be tested.

A voltage VIL, serving as an input voltage reference for a logic 0, is produced by the operation of amplifier 53. This amplifier has one grounded input terminal, and a second input terminal connected to the supply terminal 50 through a resistor R5. Feedback is provided by an adjustable resistor R6 mounted on the family limit card 23.

The voltage VOL, serving a standard logic 0 output signal, is produced by the operational amplifier 55. This amplifier has one input terminal grounded, and its second input terminal returned to the supply terminal 50 through a resistor R7. Feedback is provided by an adjustable resistor R8 on the family limit card 23.

An operational amplifier 57 produces a voltage VOH that serves as the standard logic 1 output signal. As the proper level of this signal depends somewhat on the power supply voltage $V_{cc}$ supplied to the device under test, the latter voltage is used to control one input terminal of the amplifier 57.

As shown, the voltage $V_{cc}$, produced in a manner to be described below, is applied to a potential divider comprising two variable resistors R9 and R10 mounted on the family limit card. As shown, these resistors are connected in series and the resistor R10 is connected to ground. The junction of the resistors R9 and R10 is connected to one input terminal of the amplifier 57. The second input terminal of the amplifier 57 is connected directly to the active output terminal, and is returned to the terminal 50 through a resistor R11. By that arrangement, the voltage VOH is determined by the relationship of the voltage $V_{cc}$ to the reference voltage $V_r$ and by the settings of the resistors R9 and R10.

The voltage $V_{cc}$ is produced by an operational amplifier 59 connected in series with an isolating amplifier 60. The amplifier 59 has one input terminal connected to ground, and a second input terminal connected to the supply terminal 50 through a resistor R12. A feedback loop is provided from the output terminal of the amplifier 60 through an adjustable resistor R13 on the family limit card to the input terminal of the amplifier 59.

The amplifier 60 is arranged for unity gain with a feedback resistor R14. It is supplied with power from a reference supply voltage terminal at the potential $+V_s$ through a resistor R15. The voltage drop through this resistor R15 is determined by the current drawn by the device under test at the potential $V_{cc}$. In other words, the amplifiers 59 and 60 maintain the voltage supplied to the device under test at $V_{cc}$, but the device under test determines the current that is drawn and this current is measured by the drop through the resistor R15.

A conventional level detector 61 is connected between the terminal of the resistor R15 that is connected to the amplifier 60 and ground, to produce a reject signal ICR when the voltage applied to the detector 61 indicates that too much current is being drawn by the device under test.

Figure 9:
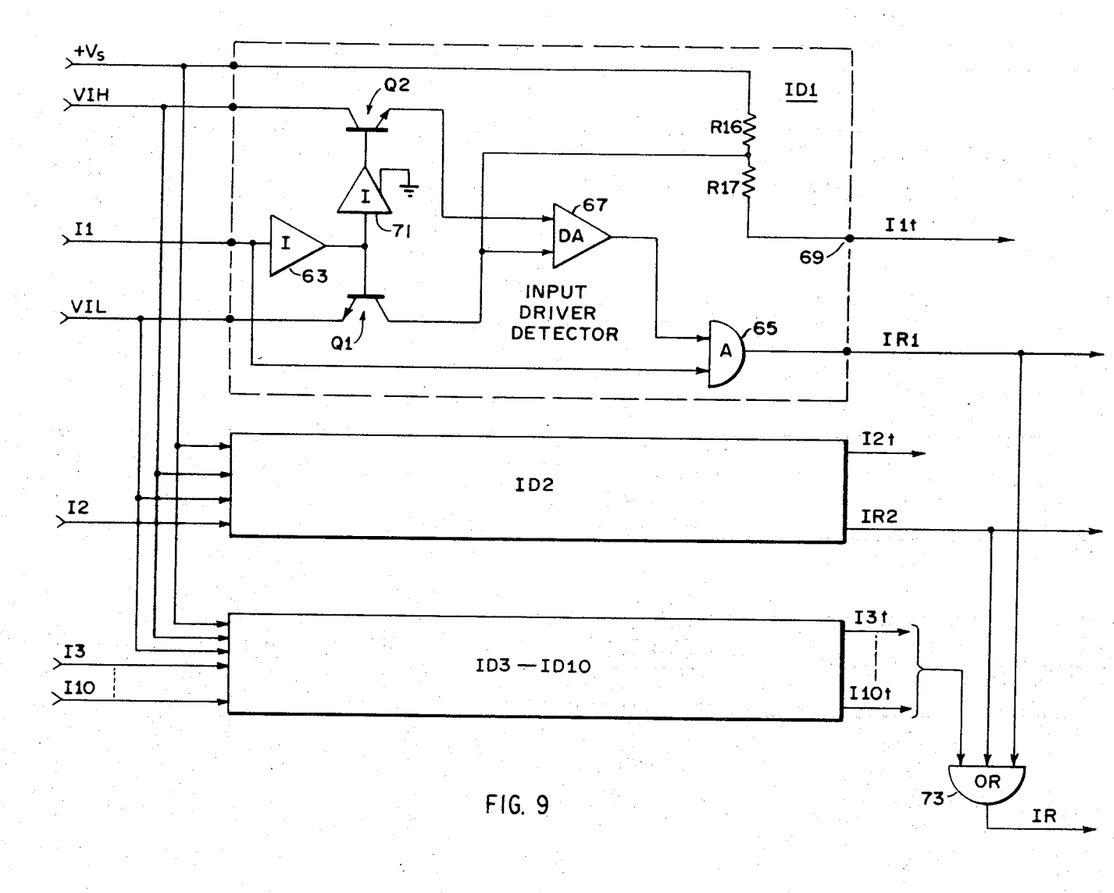
FIG. 9 is a schematic wiring diagram of the set of input driver detectors forming a portion of the test power supply and some of the reject detectors of the apparatus of FIG. 1.

FIG. 9 shows the apparatus that provides the input signals to the device under test and determines whether or not the impedance presented by the input terminals of the device under test is within specifications. For that purpose, a set of ten input driver detectors ID1 through ID10 is provided. For use with the device under test here shown for illustrative purposes, input terminals I9 and I10 from the input function generator and the output terminals on which the corresponding input signals I9T and I10T, to be described, would not be required.

Each of the input driver detectors ID1 through ID10 may be of the same construction. Therefore, only the construction of the unit ID1 is shown in detail.

Each of the input driver detectors such as the input driver detector ID1 performs two functions. First, it produces a signal, such as the signal I1t, at a predetermined logic 1 or logic zero level in dependence on the state of the input signal I1.

Second, the unit ID1 measures the current drawn at the level I1t when I1t is logic 1. When the current drawn by the device is too high, a reject signal IR1 is produced. Provision could be made for measuring the current when the input signal is at logic 0, but considerable additional apparatus would be required. An a sufficient test under the logic 0 input condition is made in another manner to be described below.

The input signal I1 is applied to a first inverter 63 and to one terminal of a two-input terminal AND gate 65. When the input signal I1 is at logic 0, the output of the inverter 63 will be high, and the AND gate 65 will be disabled. The inverter 63 controls an electronic switch, here shown as a transistor Q1 having a base circuit controlled by the inverter 63 so that the base is forward-biased with respect to the emitter when the input signal of the inverter 63 is logic 0. In that state, the transistor Q1 is biased into conduction and acts as a closed switch, allowing the reference input voltage VIL to be applied to one input terminal of a differential amplifier 67 and to the junction of a pair of resistors R16 and R17. These resistors are connected in series between a terminal receiving the supply voltage $+V_s$ and the terminal 69 upon which the signal I1t appears. The function of the unit ID1 under these conditions is simply to apply a correct logic 0 input signal I1t to the device under test.

When the input signal I1 is logic 1, the transistor Q1 is turned off, the output of the inverter 63 is low, or logic 0, and under these conditions a switch here shown as a transistor Q2 is closed. For this purpose, the transistor Q2 has a base circuit controlled by an inverter 71. The inverter 71 will bias the transistor Q2 into conduction when its input terminal, connected to the output terminal of the amplifier 63, is low.

When the switch Q2 is closed, the voltage VIH is applied to a second input terminal of the differential amplifier 67. Under these conditions, the transistor Q1 is cut off, and the voltage applied to the second input terminal of the amplifier 67 is that at the junction of the resistors R16 and R17.

The resistors R16 and R17 are mounted on the device test card 19 in FIG. 2. The rest of the apparatus of FIG. 9 forms part of the permanent test equipment 21.

When the input signal I1 is logic 1, the AND gate 65 will be enabled and will produce the signal IR1 if the output signal from the differential amplifier 67 is of the proper polarity. The apparatus is arranged so that the output signal of the amplifier 67 will be of the proper polarity to produce the signal IR1 if the voltage at the junction of resistors R16 and R17 is below the standard level VIH, indicating that too much current is being drawn by that terminal of the device under test. If the voltage at the junction of the resistors R16 and R17 is at least as high as VIH, the device is passed as to that test.

Each of the reject signals such as IR1 is connected to one terminal of a multiple input OR gate 73. The output signal IR of this gate 73 is produced when any input terminal draws too much current.

Figure 10:
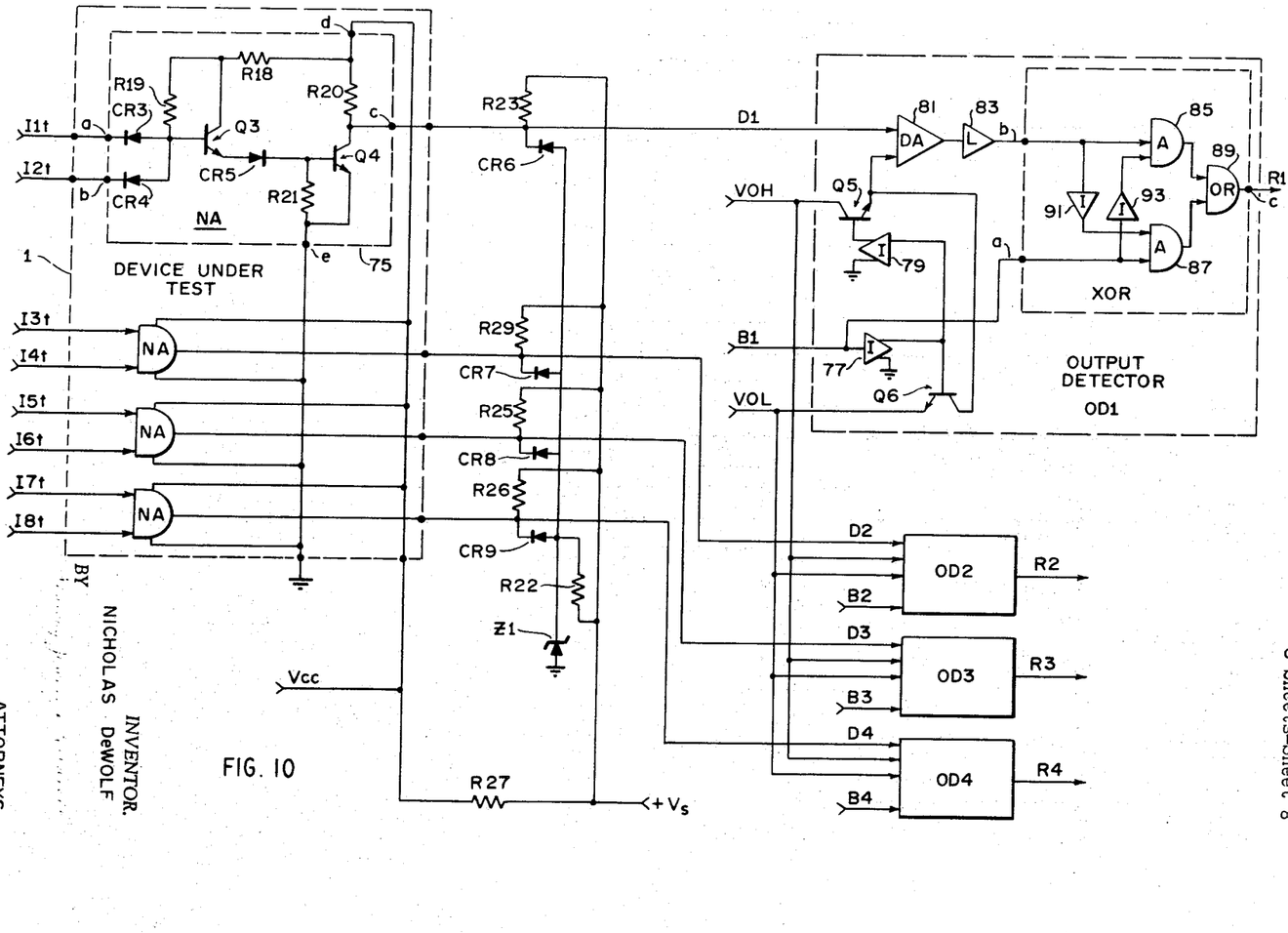
FIG. 10 is a schematic wiring diagram illustrating a typical device under test in combination with a set of output detectors comprising some of the reject detectors shown in FIG. 1.

FIG. 10 shows a typical device under test and the output detection equipment. As here shown, the device under test is an integrated circuit including four two-input, one-output NAND gates identified by the symbols NA and having common power supply and return terminals.

Many circuits are available for use as NAND gates, but as here shown each of the NAND gates NA may have the circuit construction shown for the gate 75. As shown, this gate has a pair of input terminals $a$ and $b$, and an output terminal $c$, a voltage supply input terminal $d$, and a voltage return terminal $e$.

The power supply terminal $d$ is connected to the corresponding terminal of each of the other gates NA. When the device under test is connected to the testing apparatus, the terminals $d$ receive the voltage Vcc derived as previously described in connection with FIG. 8. The return terminal $e$ is connected to the similar terminals of the other gates NA. When the device under test is connected to the device test card, these terminals are connected to ground.

The power supply terminal $d$ is connected through a pair of resistors R18 and R19 to the base of a transistor Q3. The collector of the transistor is connected to the junction of the resistors R18 and R19. Input terminals $a$ and $b$, on which the signals I1t and I2t from FIG. 9 are applied are connected to the base of the transistor Q3 through two diodes CR3 and CR4.

The emitter of the transistor Q3 is connected to the base of a second transistor Q4 through a diode CR5. The emitter of the transistor Q4 is connected directly to the ground terminal $e$. The base of the transistor Q4 is connected to terminal $e$ through a resistor R21. The collector of the transistor Q4 is connected to the output terminal $c$ of the gate 75, and is returned to the supply terminal $d$ through a resistor R20.

With this conventional construction, if either of the input terminals $a$ and $b$ is at ground potential, the transistor Q3 will be cut off and the transistor Q4 will also be cut off, causing its collector to be high, representing logic 1. When and only when both input terminals $a$ and $b$ are at logic 1, the diodes CR3 and CR4 will be reverse-biased, and the transistor Q3 will be turned on, causing the transistor Q4 to be turned on and lowering the potential at the output terminal $c$ to ground, or logic 0.

It will be apparent that if the signal I1t, for example, is at logic 1, there should be no appreciable flow of current through the diode CR3. Any appreciable current flow will indicate a defect in the circuit. Referring to FIG. 9, it will be recalled the circuits of FIG. 9 are arranged to produce a reject signal in response to the inappropriate flow of current when a logic 1 input signal is applied.

Referring to FIGS. 8 and 10, excessive current flowing though the resistors R18 and R19 in FIG. 10 when a logic 0 input signal is applied to either terminal $a$ or $b$ of the gate 75 would be detected if the excess was sufficient to cause the level detector 61 in FIG. 8 to respond. Such a test is adequate for most purposes, as it will usually be sensitive enough to detect a short in one of the resistors, and an open would be detected by a failure to produce the correct logical output signals. Further, for the purposes of testing integrated circuits, it is not usually practical to make a close check on resistors, because they are not ordinarily produced to close tolerances.

The output signals produced by the device under test are labelled D1, D2, D3 and D4. These signals are applied to a group of junctions in networks on the device test card 19. These networks comprise a connection between the power terminal at $+V_s$ through a resistor R22 and a reverse-biased Zener diode Z1 to ground.

A reference voltage will therefore appear across the Zener diode, the latter being broken down in the reverse direction. This voltage is supplied to the terminals receiving the signals D1, D2, D3 and D4 through isolating diodes CR6, CR7, CR8 and CR9, respectively. Each of the terminals on which the signals D1 through D4 appear is also returned to the terminal at the potential Vs through resistors R23, R24, R25 and R26. The networks just described serve to present appropriate load impedances to the output terminals of the device under test.

A resistor R27 is connected between the terminals on which the voltages Vs and Vcc appear. The purpose of this resistor is to provide the current fo the Vcc current-sinking regulator, and therefore sets the limit on the allowable maximum value of Icc.

The output signals D1 through D4 produced by the device under test are applied to a set of four output detectors OD1 through OD4. As each of these detectors may be of the same construction, only the details of the detector OD1 are shown.

The output signal D1 is compared with the test voltage VOH if it is a logic 1, and with the voltage VOL if it should be a logic 0. The expected state of the signal is determined by the signal such as B1 from the output function generator 13 described above in connection with FIG. 7.

The signal B1 is applied to an inverter 7, and to one input terminal of an exclusive OR gate XOR, to be described in more detail below. The output terminals of the inverter 77 control an electronic switch. As here shown, the switch comprises a transistor Q6 having a base circuit connected between the active-output terminal of the inverter 77 and ground.

The output terminal of the inverter 77 is also connected to the input terminal of an inverter 79. The inverter 79 controls an electronic switch here shown as transistor Q5.

The emitter of the transistor Q6 is connected to the supply terminal at VOL. The collector of the transistor Q5 is connected to receive the test voltage VOH.

The collector of the transistor Q6 is connected to the emitter of the transistor Q5 and to one input terminal of a differential amplifier 81. A second input terminal of the differential amplifier 81 receives the signal D1.

By the arrangement just descibed, when the signal B1 is at logic 1 potential, the output of the inverter 77 will be logic 0 and the transistor Q6 will be cut off. The output of the inverter 79 will be logic 1, biasing the transistor Q5 into conduction to apply the voltage VOH to the differential amplifier DA to be compared with the signal D1. If the signal D1 is less than VOH, indicating either that the wrong output signal is produced or that a logic 1 below the lowest acceptable level is produced, the differential amplifier 81 will produce an output signal of one polarity. That output signal is applied through a conventional limiter amplifier 83 to a second input terminal of the gate XOR. If the signal D1 is too low under these conditions, that signal from the limiter amplifier 83 will be a standard logic 0 signal. On the other hand, if the signal D1 is above VOH, indicating a proper logic 1 output signal from the gate 75, the amplifier 81 will produce a signal of the opposite polarity, causing the limiter amplifier 83 to apply a standard logic 1 signal to the gate XOR.

The gate XOR is a conventional exclusive OR gate, or digital comparator. It may be of any conventional construction, but as here shown it comprises a pair of AND gates 85 and 87, an OR gate 89, and a pair of inverters 91 and 93. As shown, each of the input terminals $a$ and $b$ is connected to one terminal of an AND gate, the terminal $a$ being connected directly to one input terminal of the gate 87 and the terminal $b$ being connected to one input terminal of the gate 85. Each input terminal is also connected to a second input terminal of the other gate through one of the inverters 91 or 93. The output terminals of the gates 85 and 87 are connected to the input terminals of the gate 89, to produce an output reject signal R1 when and only when different signals are applied to the terminals $a$ and $b$. Thus, if the input signal B1 from the output function generator is logic 1 and the signal D1 is at an appropriate level for logic 1, both terminals $a$ and $b$ will be at logic 1 potential and the reject signal R1 will not be produced.

If the expected output signal B1 is logic 0, the transistor Q6 will be biased into conduction by the inverter 77, and the transistor Q5 will be cut off. The voltage VOL will then be applied to the input terminal of the amplifier 81. At this time, if the voltage D1 is higher than it should be for logic 0, the amplifier 81 will produce an output of the proper polarity to cause the limiter 83 to apply a logic 1 signal to the input terminal $b$. Since the terminal $a$ is at logic 0, the reject signal R1 will be produced. On the other hand, if the signal D1 is below the highest tolerable level for a logic 0, the output of the amplifier 81 will cause the limiter 83 to apply a logic 0 signal to the terminal $b$ of the gate XOR, inhibiting the production of the reject signal.

It will be apparent that the output detectors such as OD1 will reject a device which produces either the wrong logical output signal, or the correct logical output signal but at an incorrect level. Output signals at logic 1 that are higher than standard or logic 0 signals that are lower than standard are not usually a problem in digtal circuits, and the apparatus does not test for those conditions. The overall operation of the testing apparatus of my invention will be generally apparent from the above description, but will be briefly described. Operation will be discussed on the assumption that the device under test is of the type shown in FIG. 10.

Assume that the device test card 19 and the family limit card 23 are plugged into the permanent test equipment 21 and that the apparatus is on. Before the device under test is plugged in, with the switch 7 in FIG. 3 in the manual position, the flip-flop SF will quickly be set because the output detectors OD1 through OD4 in FIG. 10 will respond to the inappropriate signals appearing on the terminals of the device test card adapted to receive the device under test. The reject lamp KR in FIG. 4 will stay on.

With the swtich 7 in FIG. 3 in the automatic position, the lamp KR will stay on most of the time, because most of the inputs supplied by the input function generator and the test power supply will produce an inappropriate output. Thus, the input function generator will be stepped at a rate determined by the delay provided for a reject display.

As soon as the device under test is plugged in, with the apparatus in the automatic mode of operation, the gate 27 in FIG. 3 will be enabled and the input function generator in FIG. 5 will begin to sequence through the possible input states. Assuming for the sake of illustration that the emitter of the transistor Q4 in the gate 75 is open (FIG. 10), that gate will be unable to produce a logic 0 output signal. Accordingly, each time the input function generator in FIG. 5 produces signals I1 and I2 both at logic 1, causing the output function generator gate 49 in FIG. 7 to produce a logic 0 signal B1, and causing the test power supply input driver detectors in FIG. 9 to produce the logic 1 signals I1$t$ and I2$t$, the gate 75 will produce an output logic 1 signal causing the output detector OD1 to produce a reject signal. This reject signal will cause the lamp KR1 to glow, as well as the reject lamp KR.

The gate 33 in FIG. 4 will produce an output signal causing the pulse generator 37 to produce a reject pulse. That pulse will trigger the one-shot multivibrator OS1 in FIG. 3 to cause the apparatus to pause at each such sequence and display the input sequence that caused the reject. As shown in FIG. 4, that would include any sequence in which the lamps KC1 and KC2 were lit. It has been found that a trained operator can detect many specific conditions by observing the blinking pattern of lights produced in this fashion.

While I have described the apparatus of my invention with respect to the details of a particular embodiment thereof, many changes and variations will occur to those skilled in the art upon reading my description, and such can obviously be made without departnig from the scope of my invention.

Having thus described my invention, what I claim is:

1. Apparatus for testing digital circuits having $m$ input terminals comprising a sequence generator for producing a set of at least $m$-bit digital signals corresponding to a set of operative digital input signals that can be applied to said terminals, first and second reference signal sources each of which produces a different one of two digital signals at levels corresponding to correct logic 0 and logic 1 signals for an input terminal of the circuit to be tested, switching means for connection between said reference signal sources and the input terminals of the circuit to be tested and controlled by said sequence generator for applying one or the other of said reference source signals to each of said input terminals according as the corresponding bit of the output signal of said sequence generator is 1 or 0, impedance sensing means connected with at least one of said reference sources for sensing the currents drawn into input terminals of the circuit to be tested in response to at least one of said reference source signals, and means controlled by said impedance sensing means for producing a test output indication when the impedance presented by at least one of said input terminals is beyond a predetermined limit.

2. Apparatus for testing digital circuits having input terminals and $n$ output terminals, comprising an input signal sequence generator for producing a set of digital signals corresponding to a set of operative signals that can be applied to the circuit to be tested, a digital signal source controlled by said input signal sequence generator for applying to each input terminal of a circuit to be tested an input signal at a level determined by the truth value of the corresponding bit of the digtal signal produced by said input signal sequence generator, an output signal sequence generator controlled by said input signal sequence generator and having $n$ output terminals and a truth table corresponding to that of the circuit to be tested for producing an output signal sequence corresponding to the proper output signal sequence for the circuit to be tested in response to each input signal sequence produced by said input signal sequence generator, reference signal generating means for producing two reference signals at levels corresponding to specified limits of the proper logic 1 and logic 0 output signals from the circuit to be tested, means connected to said reference signal generating means for connection to the output terminals of the circuit to be tested and controlled by said output signal sequence generator for comparing the output signal at each output terminal of the circuit to be tested with one of said reference signals selected in dependence on the truth value of the corresponding bit of the signal sequence produced by said output signal sequence generator.

3. A digital circuit tester for a digital circuit having input terminals and at least one output terminal, comprising a reference circuit having the same truth table as the circuit to be tested, means for sequentially applying a set of digital input signals in parallel to the circuit to be tested and to the reference circuit, analog comparator means for producing an output signal in accordance with the difference between two applied signals, means for applying the signal at the output terminal of the circuit under test to said analog comparator means, a first reference signal source for producing a signal at an analog level corresponding to an output signal of minimum acceptable level for one truth value, a second reference signal source for producing a signal at an analog level corresponding to an output signal of maximum acceptable level for a second truth value, means controlled by said reference circuit for applying the signal from one of said sources selected in dependence on the truth value of the reference circuit output signal as a reference signal to said analog comparator means, digital signal generating means controlled by said analog comparator means for producing a signal having a first or a second truth value according as the output signal from the circuit to be tested is greater or less than the reference signal applied to said comparator means, and a digital comparator controlled by said reference circuit and said digital signal generating means for producing a signal indicating a defective condition when the signals produced by said reference circuit and said signal generating means are different.

4. A circuit for testing the digital truth value and analog level of the output signal from a digital circuit which has input terminals and at least one output terminal, comprising differential amplifier means having first and second input terminals and an output terminal and responsive to signals applied to its input terminals for producing a first or a second signal at its output terminal according as the signal applied to its first input terminal is greater or less, respectively, than the signal applied to its second input terminal, means for applying the output signal from the circuit to be tested to said first input terminal, first digital signal generating means controlled by said differential amplifier means for producing a digital signal having a first or a second truth value according as said differential amplifier means produces said first or said second signal respectively, a first reference signal source for producing a signal at an analog level corresponding to an output signal of minimum acceptable level for a first truth value, a second reference signal source for producing a signal at an analog level corresponding to an output signal of maximum acceptable level for a second truth value, sequence generating means for sequentially applying a set of input signals to the circuit to be tested, second digital signal generating means controlled by said sequence generating means for producing a digital reference signal corresponding to the proper output signal from the circuit to be tested, switching means responsive to said digital reference signal for applying the signal from said first or said second reference signal source to said second input terminal according as the output signal from said source should have said first or said second truth value respectively, and comparator means controlled by said first and second digital signal generating means for producing an output signal when the signals produced by said digital signal generating means are different.

5. In combination, sequence generating means having $m+n$ output terminals and responsive to a series of applied stepping signals for cyclically producing on said output terminals a set of permissible sequences each comprising an $m$-bit digital signal sequence and an $n$-bit digital signal sequence that is a predetermined function of said $m$-bit sequence, a first set of $m$ test terminals adapted to be connected to the input terminals of a circuit to be tested, a second set of $n$ test terminals adapted to be connected to the output terminals of a circuit to be tested, a first reference signal source for producing a digital signal at a predetermined level selected to represent a first truth value, a second reference signal source for producing a digital signal at a predetermined level selected to represent a second truth value, a third reference signal source for producing a digital signal at a predetermined level that is the minimum acceptable as said first truth value, a fourth reference signal source for producing a digital signal at a predetermined level that is the maximum acceptable as said second truth value, switching means controlled by the $m$ output terminals of said sequence generating means on which said m-*bit* signal appears for applying to each of said first set of test terminals the digital signal from said first or said second source according as the corresponding bit of said $m$-bit signal is of said first or said second truth value respectively, $n$ first comparator means each having first and second terminals and responsive to first and second applied signals, respectively, applied to those terminals thereof for producing a digital output signal corrseponding to said first truth value or said second truth value according as said first applied signal is larger or smaller than said second applied signal, means connecting each of said $n$ test terminals to the first terminal of a different one of said comparator means, switching means controlled by the $n$ terminals of said sequence generator for applying the signals from said third or said fourth reference signal sources to the second input terminal of each of said comparators according as the corresponding bit of said $n$-bit signal has said first or said second truth value respectively, $n$ second comparator means each responsive to two applied digital signals to produce an output signal when said applied signals are different, and means for applying to each second comparator means the output signal of one of said first comparator means and a corresponding $n$-bit signal from said sequence generator.

6. Apparatus for testing any member of a set of families of digital circuits each having not more than $m$ input terminals and $n$ output terminals, comprising a basic chassis on which are mounted a digital counter, a power supply, a set of operational amplifiers, and a set of comparators, a family limit subassembly for each family in said set adapted to be connected to said chassis and comprising a set of impedances adapted when connected to said amplifiers in a predetermined pattern to produce the signal levels required for simulating input signals and testing output signal levels for the members of the family, circuit means effective when a family limit subassembly is connected to said chassis to connect said impedances to said amplifiers in said pattern, an individual subassembly for each circuit to be tested, each individual subassembly being adapted to be connected to said chassis and to the circuit to be tested, a reference circuit on each of said individual subassemblies having the same truth table as the circuit to be tested, circuit means controlled by said counter and effective when a family limit subassembly and an individual subassembly are connected to said chassis and a circuit to be tested is connected to said individual subassembly for sequentially supplying a sequence of admissible input signals to the circuit under test and to the reference circuit from ones of said operational amplifiers selected in dependence on the output of the counter, means controlled by said reference circuit and said comparators for comparing the output signals from the circuit under test with signal levels from ones or said operational amplifiers selected in dependence on the output of the reference circuit, and indicating means controlled by said comparators for indicating an inappropriate output signal from the circuit under test.

7. Circuit testing apparatus for electrical circuits having not more than $m$ input terminals and not more than $n$ output terminals, comprising first sequence generating means having $m$ output terminals for producing a sequence of $m$-bit binary signals each corresponding to a different one of the set of input terminal states in which the circuit to be tested is expected to operate, second sequence generating means controlled by said first sequence generating means and having $n$ output terminals for producing on its output terminals an $n$-bit output signal sequence for each applied $m$-bit sequence corresponding to the state of the output terminals of the circuit under test when operating properly in response to the same applied sequence, a reference source of digital signals at predetermined 1 and 0 levels, switching means controlled by said first sequence generating means for applying input signals to a circuit to be tested in accordance with the signals from the first sequencing means, and comparator means controlled by said second sequence generating means for comparing the signal at each output terminal of a circuit to be tested with one of two reference levels selected in dependence on the truth value of a corresponding bit of the output signal from said second sequence generating means.

8. Circuit testing apparatus as defined in claim 7 further comprising
active load-simulating means
for applying an active load signal to each output terminal of a circuit to be tested.

9. Circuit testing apparatus as defined in claim 8 in which said load-simulating means is arranged for presenting to each output terminal of a circuit to be tested both an impedance corresponding to the load impedance to be driven by an output signal at said 1 level and a signal corresponding to the load signal to be driven by an output signal at said 0 level.

10. In a circuit tester, the combination of an input function generator responsive to a series of counting pulses to produce a sequence of $m$-bit digital signals, a set of reference signal sources for producing first, second, third and fourth signals corresponding to the standard T1 and T2 and minimum acceptable T1 and maximum acceptable T2 signals, respectively, where T1 and T2 are the two truth values of a binary set, a first set of $m$ test terminals adapted to be connected to the input terminals of a digital circuit to be tested, first switching means controlled by said input function generator for applying signals to said test terminals selected from said first and second signals in dependence on the signal sequence produced by said input function generator, an output function generator controlled by said input function generator for producing in response to each $m$-bit sequence an $n$-bit sequence of signals that is the function of the m-bit sequence determined by the truth table of the circuit to be tested, a second set of $n$ test terminals adapted to be connected to the output terminals of the circuit to be tested, and comparator means controlled by said output function generator for comapring the signal at each of said second test terminals with one of said third and fourth signals selected in dependence on the truth value of the corresponding bit of the $n$-bit sequence of signals produced by said output function generator.

11. The apparatus of claim 10, in which each of said comparator means produces a digital output signal having a truth value dependent on the sign of the difference between the levels of the signals applied to it, and further comprising a digital comparator connected to each of said comparator means and to said output function generator for producing an output signal when the output signal of the comparator means and the corresponding bit of the output signal from the output function generator are different.

12. The apparatus of claim 11, further comprising indicating means responsive to each of said digital comparators for producing an indication in response to an output signal therefrom, and further comprising a source of counting pulses, switching means having a first and a second state, means controlled by said switching means in its first state for applying said counting pulses to said input function generator, and time delay means responsive to the output signal from any of said digital comparators for setting said switching means to its second state for a predetermined time.

13. The apparatus of claim 10, in which said input function generator comprises means for sequentially producing a full cycle of binary output sequences each differing from the immediately preceding sequence and from the immediately following sequence in a single bit.

14. The apparatus of claim 13, in which said input function generator comprises a first complementing flip-flop responsive to a train of applied counting pulses to produce first and second electrically independent trains of counting pulses on its output terminals 180 degrees out of phase, a second complementing flip-flop connected to said first flip-flop to be complemented by each pulse of said first train, a third flip-flop, and means controlled by said first and second flip-flops and responsive to each pulse of said second train when said first flip-flop is in a predetermined state to change the state of said third flip-flop.

15. Apparatus for testing a digital circuit having a predetermined truth table, comprising a reference circuit having said truth table, sequencing means for sequentially producing a set of permissible input signals in parallel for the circuit to be tested and applying it to the reference circuit, driver and impedance detecting means receiving said sequential set of parallel input signals and for applying to the circuit under test input drive signals having ONE and ZERO values according to the bits of said signal set and for sensing when the circuit under test draws an excessive current at at least one of said drive signal values, and means controlled by the reference circuit for comparing the output signals of the circuit to be tested with analog reference signals selected in dependence on the output signals from the reference circuit.

16. Apparatus for testing a digital circuit as defined in claim 15 further comprising load-simulating circuit means for applying, to each terminal of the circuit under test at which it produces said output signals, active load conditions for the circuit under test, said load-simulating circuit means including both an electrical load presenting to each such output terminal the electrical load to be driven by a ONE output signal and a load source presenting to each such output terminal the electrical load to be driven by a ZERO output signal, and in which said comparing means tests the output signals of the circuit to be tested with said load conditions applied to the output signals.

17. Means for evaluating the analog and digital performances of a circuit having an output terminal on which first and second digital signals at two different predetermined analog levels should appear in sequence in response to first and second input signals sequentially applied to the circuit, comprising sequencing means for sequentially applying said first and second input signals to the circuit to be tested, independent circuit means controlled by said sequencing means for producing digital signals corresponding in truth value to those that should be produced by the circuit under test in response to the applied signals, a first reference signal source for producing a signal at a predetermined minimum acceptable level for the highest of said predetermined analog levels, a second reference signal source for producing a signal at a predetermined maximum acceptable level for the lowest of said predetermined analog levels, first comparator means having a first input terminal adapted to be connected to the output terminal of the circuit to be tested, said first comparator means further comprising a second input terminal, an output terminal, and means responsive to two signals applied to its input terminals to produce a digital output signal having a truth value determined by the sign of the difference in levels between the signals applied to its input terminals, switching means controlled by said independent circuit means for applying the signal from said first or said second reference source to the second input terminal of said first comparator means, and second comparator means responsive to the output signals from said first comparator means and said independent circuit means for producing an output signal when they are different.

18. Apparatus for testing a digital circuit having a set of different permissible digital input signal sequences, each comprising a series of signals that are low and high in different permutations, comprising a first signal sequence generator for connection to the circuit to be tested and for sequentially producing said set of input signal sequences and applying them to the circuit to be tested, a second sequence generator controlled by said first sequence generator for producing an output signal sequence corresponding digitally to the output signals that should be produced by the circuit to be tested, a low reference signal source, a high reference signal source, and comparator means for connection to the circuit to be tested and controlled by said second sequence generator for comparing the analog value of the output signals produced by the circuit to be tested with the reference signal from said high or said low reference signal source in dependence on the output signal sequence produced by said second sequence generator, and for producing a reject-indicating signal when the circuit to be tested produces an output signal higher than said low reference signal when said second sequence generator produces a correspondingly placed signal with a low value, and alternatively, when the circuit to be tested produces an output signal lower than said high reference signal when said second sequence generator produces the correspondingly placed signal with a high value.

References Cited
UNITED STATES PATENTS

| | | | |
|---|---|---|---|
| 2,911,594 | 11/1959 | Knight | 324—158 |
| 3,179,883 | 4/1965 | Farrow | 324—73 |
| 3,286,175 | 11/1966 | Gerbier | 324—73 |

ALFRED E. SMITH, Primary Examiner

UNITED STATES PATENT OFFICE
CERTIFICATE OF CORRECTION

Patent No. 3,562,644      Dated February 9, 1971

Inventor(s) Nicholas DeWolf

It is certified that error appears in the above-identified patent and that said Letters Patent are hereby corrected as shown below:

In column 1, in the heading, after:

"Nicholas DeWolf, c/o Teradyne, Inc., 87 Summer St., Boston, Mass. 02110"

insert --, assignor to Teradyne, Inc., Boston, Mass., a corporation of Massachusetts--.

In column 5, line 64, change "FIG. 11" to --FIG. 1--.

In column 8, line 4, "CS1F" should be changed to --Cl]

In column 8, line 36, "flop-flop" should be --flip-fl(

In column 10, line 60, "19" should be changed to --I9·

In column 11, line 2, "An" should be changed to --And·

In column 12, line 64, "fo" should be --for--.

In column 13, line 3, "7" should be changed to --77--,

In column 14, line 59, change "departnig" to --depart:

Signed and sealed this 7th day of December 1971.

(SEAL)
Attest:

EDWARD M. FLETCHER, JR.      ROBERT GOTTSCHALK
Attesting Officer      Acting Commissioner of Pater